Patented Apr. 25, 1933

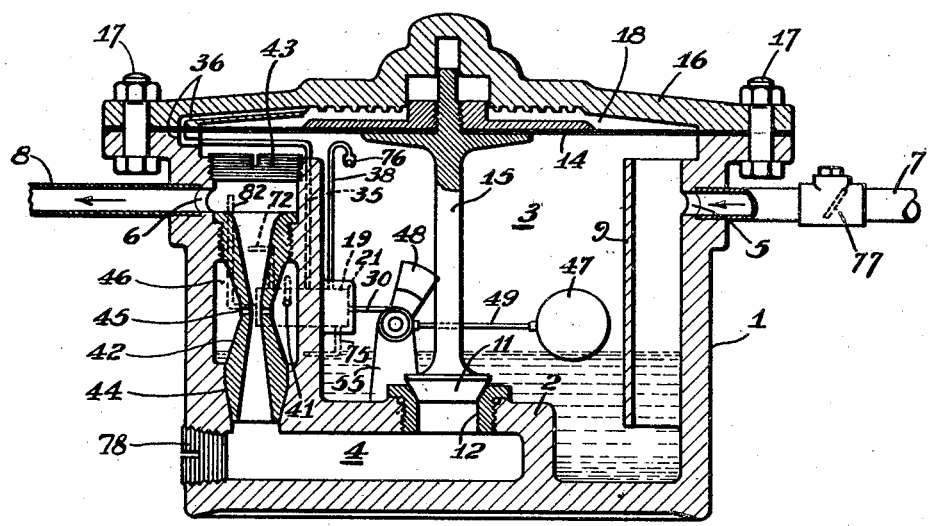

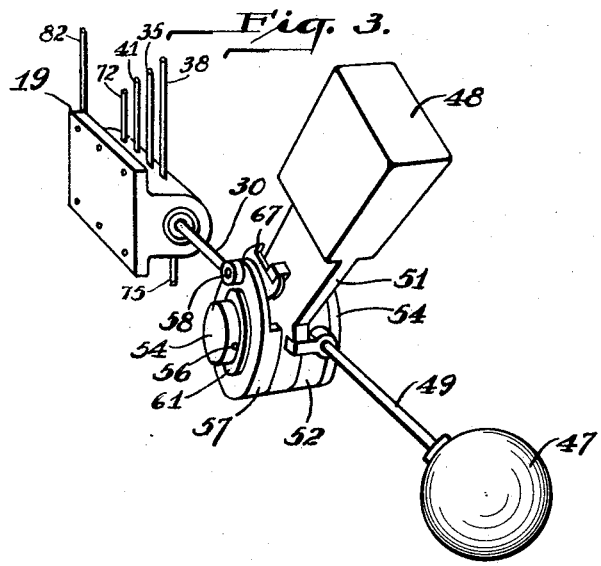
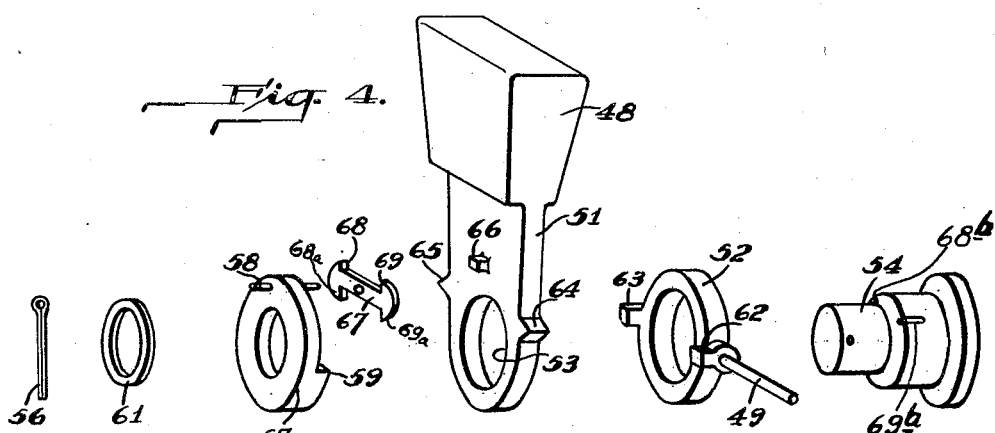
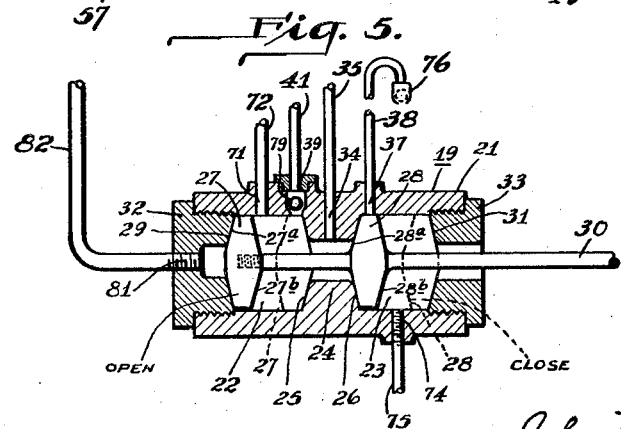

1,904,994

UNITED STATES PATENT OFFICE

JOHN M. MALONE, OF PITTSBURGH, PENNSYLVANIA

STEAM TRAP

Application filed March 1, 1932. Serial No. 596,049.

This invention relates to steam traps of the kind commonly employed in steam lines for collecting and discharging condensate therefrom, and has for its primary object the provision of an improved form of trap of such character which is simple and sturdy of construction and in which the pressure in the system to which it is connected rather than the buoyancy of the condensate collected in it is employed to operate its discharge valve.

Another object is to provide a trap the operation of which will not be altered by variations in pressures in the systems to which it may be connected, and which is constructed with a minimum number of parts all of which are so arranged as to permit their being readily removed or repaired with ease and without necessitating the trap proper being removed from the line to which it is connected.

A further object is to provide a trap embodying the aforementioned features which may be used in either a positive pressure or vacuum system.

These and the various other objects as well as the other novel features and advantages of the invention will be readily understood from the following description when read in conjunction with the accompanying drawings wherein Fig. 1 is a vertical sectional view of a single embodiment of the invention; Fig. 2 a top plan view of the same with the cover plate and valve actuating diaphragm removed; Fig. 3 a perspective view of the pilot valve and its gravity and float-actuating mechanism; Fig. 4 an exploded view of the pilot valve-actuating mechanism; and Fig. 5 a longitudinal sectional view of the pilot valve.

Referring in detail to the invention as illustrated in these drawings the numeral 1 designates the body or casing of the trap and 2 a partition which is provided therein for dividing it into an inlet chamber 3 and an outlet or discharge chamber 4. Near the top and at one side of the casing there is provided an inlet orifice 5 and diametrically opposite thereto an outlet orifice 6 for connecting the trap to a steam line 7 and a discharge pipe 8. To baffle the flow of condensate or water as it enters the trap by way of pipe 7 an open ended semi-circular wall 9 is provided opposite the inlet orifice 5, and to control the discharge of the condensate from the trap a valve 11 is arranged to seat in a valve opening 12 provided in wall 2 at a point concentric with the center of casing 1.

In accordance with the invention, to utilize the pressure of the system in which the trap is connected to operate valve 12, a flexible diaphragm 14 is mounted over the top of chamber 3 and connected to valve 12 by a stem 15. This diaphragm is held in place by a cover plate 16 which is detachably secured to the top of the casing by bolts 17 and so shaped as to form with the diaphragm 14 a pressure chamber 18. This pressure chamber is utilized for controlling the movement of the diaphragm 14 which in turn controls the operation of valve 12. Such result is attained by controlling the pressure in chamber 18, and this is accomplished by means of a pilot valve mechanism 19 shown in detail in Fig. 5.

The pilot valve mechanism, as illustrated more particularly in the aforementioned figure, comprises a casing 21 which is suitably secured to the side of that portion of the partition or wall 2 which is extended in substantially the form of a tube along the vertical wall of casing 1. The center of casing 21 is bored to form a pair of cylindrical valve chambers 22 and 23 which are partially separated by an inwardly tapered annular rib 24 the opposite faces 25 and 26 of which form seats for a pair of disk-shaped valves 27 and 28, respectively, that are mounted on a valve stem 30 for reciprocable movement in chambers 22 and 23. These valves each have tapered faces 27a and 27b and 28a and 28b which seat on seats 25 and 26 and 29 and 31, the latter being provided on the inner end of a pair of plugs 32 and 33 which are screwed into and form the outer ends of the chambers 22 and 23. Because these valves are adapted to seat on their alternate faces, they are loosely mounted in the valve casing and hence are adapted to be moved with considerable ease without affecting or impairing their operation.

In the center of casing 21 an opening 34 is extended through the rib 24 to the passage connecting the two chambers 22 and 23, and in this opening a tube 35 is connected which in turn is connected to the pressure chamber 18 above the diaphragm 14, the upper end of the tube being connected to chamber 18 by way of a passage 36 bored in the casing 1 and cover 16. Adjacent the opening 34 a second opening 37 is extended through casing 21 and into the valve chamber 23. To this passage a tube 38 is connected and extended upwardly into chamber 3 to a point above the high water level in the trap. This latter connection is utilized to connect chamber 3 with chamber 18 to thereby communicate the pressure obtaining in chamber 3 to chamber 18 when valve 28 is not seated on seat 26. On the opposite side of opening 34 an opening 39 is extended through casing 21 into chamber 22. Between this opening and the mid-section of the vertically disposed part of partition 2 a tube 41 is connected. The purpose of this latter tube is to provide for communicating the outlet pressure in chamber 4 to pressure chamber 18 which it does when valve 28 is seated on the valve seat 26 of rib 24.

With such an arrangement, when the pilot valve is operated so that valves 27 and 28 are seated on the seats 29 and 26, as shown in full line in Fig. 5, chamber 18 is connected by way of tubes 35 and 41 with the outlet chamber 4. Under such conditions, if the trap is connected in a pressure system the pressure in chamber 18 will be atmospheric pressure or lower, as will presently appear, and hence lower than the pressure in chamber 3. Due to this unbalanced pressure condition on diaphragm 14 the diaphragm is flexed upwardly and valve 11 lifted from its seat, thereby permitting the condensate in the trap to be forced out through pipe 8. However, when valves 27 and 28 are moved to the positions shown by the dotted lines in Fig. 5, that is, when they are seated on the seats 25 and 31, chamber 18 is connected to chamber 3 by way of tubes 35 and 38. With such connection the pressure on the two sides of diaphragm 14 is the same and valve 11 is closed by gravity.

To insure the valve 11 being held open until the condensate is sufficiently discharged from chamber 3 once the discharge valve is operated, a sleeve-like Venturi tube 42 is fitted in the vertical tubular part of the outlet chamber 3. For assembling this sleeve a plug 43 is threadably provided in the top of tube-forming wall 2, and the top of sleeve 42 is threaded to screw into threads cut in the upper end of wall 2 at a point slightly below orifice 8. The lower end of the sleeve in turn is tapered to fit tightly into a taper-receiving opening 44 provided at the point where the vertical part of wall 2 meets the horizontal portion thereof.

In the center of sleeve 42, which is restricted, a hole 45 is drilled and hence due to a well known action when the water is forced through this tube with the opening of valve 11 a suction is set up in chamber 46 which surrounds the middle portion of the tube. This suction in turn is communicated to chamber 18 by tubes 41 and 35, thus providing a pressure in chamber 18 which is lower than the pressure in chamber 3 irrespective of whether the normal pressure in that chamber is decreased by the opening in valve 11 or not.

For automatically operating valves 27 and 28 a float 47 and a weight 48 are employed. The assembly of these is illustrated most clearly in Figs. 3 and 4 and as shown comprises a rod 49 to which the float is attached and an arm 51 on which the weight is secured. The end of rod 49 opposite the float is secured to a ring 52 while the end of arm 51 opposite the weight has a hole 53 provided in it, and through this hole and the ring 52 a pin 54 is mounted to function as a pivot therefor, the pin itself being supported in a pair of brackets 55 disposed on the floor of casing 1. For holding the pin in these brackets a cotter pin 56 is employed.

Adjacent arm 51 which is mounted next to ring 52 on pin 54 a collar 57 is located. This collar is equipped with a pin 58 which is disposed in line with and attached to the end of the valve stem 30. Hence any rotation of the collar is adapted to move valves 27 and 28.

For reasons of assembly pin 54 is provided with portions of two different diameters. One of these is the same as the openings in arm 51 and ring 52, and the other, which is smaller, is the same as that of the opening in collar 57. About the edge of the collar 57 a flange 59 is provided which is adapted to fit over the larger part of pin 54 and adjacent the collar a washer 61 is mounted.

To rotate collar 57 and move stem 30 a pair of lugs 62 and 63 are provided at diametrically opposed positions on ring 52 and arranged to project over the outer edge of the lower end of arm 51 which is semi-circular in shape and adapted to engage shoulders 64 and 65 formed on arm 51. These shoulders are disposed at an angular distance from each other which is less than 180° for a purpose which will presently be apparent.

To complete the connection to collar 57 a lug 66 is formed on the side of arm 51 adjacent the collar and at a point thereon to engage one or the other end of a double ended latch 67 pivotally mounted on the inner end of pin 58. To permit the mounting of this latch the flange 59 is cut away over a sector of its circumference. With such an arrangement, with the float 47 arranged to ride on the surface of the condensate deposit in chamber 3 as the float is borne upward with the rising of the water in the trap, the lug 62 on ring 52 engages the shoulder 64 on arm 51 and thereby causes the weight 48 to be rotated about the pin 54. As soon as the center of gravity of the weight is moved over the center of pin 54 the weight falls due to gravity and in falling lug 66 on arm 51 engages the shoulder 68 of latch 67. By reason of this and the latch being connected to the collar 57 the latter is rotated by the weight in a backward direction, as shown in the drawings, until the valves 27 and 28 are seated on the seats 26 and 29, respectively. As previously described, when these valves are in such position chamber 18 is connected to tube 41 and valve 11 is opened. Conversely, as the level of the water is lowered due to valve 11 being open, float 47 is lowered and in lowering the lug 63 on the ring 52 engages the shoulder 65 on arm 51. This causes the weight 48 to be rotated in a direction opposite to that previously referred to. As soon as it passes over the center of the pin it again falls due to gravity but in a direction such that lug 66 engages the end 69 of latch 67 whereby collar 57 is rotated to move valves 27 and 28 against seats 25 and 31. To insure the proper operation of the valves 27 and 28 pin 54 is mounted so it will not rotate and latch 67 is provided with depending lugs 68a and 69a which engage in notches 68b and 69b in pin 54. Through the use of these rod 30 is prevented from moving and the depending lugs 68a and 69a are disengaged from their respective grooves due to teetering of the latch by engagement therewith of the lug 66. With these valves in this position, as set forth above, chamber 18 is connected with chamber 3. Due to the pressures on the two sides of diaphragm 14 being thus neutralized, valve 11 is closed by gravity.

Obviously from the foregoing the pilot valve mechanism is adapted to positively insure the opening and closing of the discharge valve 11 when the water in chamber 3 is at preselected levels, and the operation of the discharge valve is effected by the pressure available in the trap, or the system to which it is connected.

While the structure described above is sufficient for use in positive pressure systems, it is also possible to make use of it in a vacuum system with a few additional features. For use in such systems a second opening 71 extending into chamber 22 is provided in casing 21 of the pilot valve and a tube 72 extended from this opening through the wall of casing 1. This tube in turn is connected by an extension 73 to the vacuum line of the system at a point ahead of the condensate level. The purpose of this connection is to provide a vacuum in chamber 3 and also to provide a reduced vacuum in chamber 18 when it is desired to open valve 11. A second opening 74 is also extended through casing 21 into chamber 23 and this connected by a tube 75 through casing 1 to the atmosphere or to a suitable source of air or steam pressure. This latter connection is made to provide a pressure in chamber 18 which will prevent the suction in chamber 3 pulling the valve 11 open when it is desired to maintain that valve closed, and for forcing the condensate out of the trap when valve 11 is open. With these provisions when valves 27 and 28 are seated on seats 25 and 31 valve 11 is held closed by the atmospheric or positive pressure, depending upon the connection in tube 75, which is communicated to chamber 18 by way of tubes 75 and 35, and when these valves are seated on seats 29 and 26 valve 11 is forced open by reason of chamber 18 being connected by way of tubes 35 and 72 with the vacuum of the system ahead of the condensate level and atmospheric or positive pressure being communicated to chamber 3 by way of tube 75 and the opening in plug 33 about the valve stem 30.

To prevent dissipation of the vacuum in the system when such latter connection is made a check valve 76 is provided in the end of tube 38 and a check valve 77 is provided in the inlet pipe 7. This latter check valve is adapted, however, to not prevent the flow of condensate by gravity into the inlet chamber when valve 11 is closed. Under such conditions, as set forth above, a vacuum is also established in chamber 3 by the connection 72, hence permitting the valve 77 to operate freely.

For discharging the condensate from the trap when atmospheric pressure only is communicated to tube 75 a plug 78 is provided in the wall of casing 1 in communication with chamber 4 at a position to permit the condensate to move freely from that chamber. This is not necessary when tube 75 is connected to a source of pressure as such pressure will force the condensate out of the trap in the customary manner.

To render the connection 41 inoperative when the trap is used in a vacuum system, a check valve 79 may be provided in casing 21 opposite the end of tube 41, and to provide for connecting the tube 72 with inlet chamber 3 when valve 27 is seated on seat 25 a tube 81 is connected to an opening 82 in the plug 32 and extended upwardly in chamber 3 to a point above the high water level. Obviously the trap so adapted for use in a vacuum system will operate under the control of the float 47 and the weight 48 in the same fashion as previously described with its use in a pressure system, and as will be readily appreciated when such connections are provided and the trap is used in a pressure system instead of a vacuum system the tubes 72 and 75 will be closed either by means of lugs or valves such as the valves 83 and 84 as shown in Fig. 2.

Among the advantages of the invention is the provision of a trap of simple construction which may be readily and easily assembled as well as disassembled for the purpose of making repairs, and which may be either adapted for use in a pressure or vacuum system, and also has the advantage that it is adapted to be positively opened and closed when the water level in the trap is at preselected levels. This latter is brought about by the proper spacing of the lugs on the ends of the latch 67 and the spacing between the shoulders 64 and 65 and the lugs 62 and 63 on the ring 52 on which the float is attached.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim as my invention:

1. A steam trap comprising an enclosed casing having an inlet and an outlet orifice provided therein, a partition dividing said casing into an inlet chamber containing said inlet orifice and an outlet chamber containing said outlet orifice, a discharge valve seated in a valve opening in said partition, a flexible partition arranged in the upper portion of said inlet chamber and forming a pressure chamber with the top of said casing, means operably connecting said valve to said flexible partition, and means responsive to the level of condensate collected in the inlet chamber for selectively placing said pressure chamber in communication with the inlet chamber and the outlet chamber to control the opening and closing of said valve in response to the resultant movement of said flexible partition.

2. A steam trap comprising a casing equipped with a detachable cover and provided with inlet and outlet orifices, a partition dividing said casing into an inlet chamber containing said inlet orifice and an outlet chamber containing said outlet orifice, a valve seated in an opening in said partition, a flexible diaphragm mounted between said cover and said casing and forming a pressure chamber with the former, a valve stem connecting said diaphragm with said valve, and means responsive to the level of the condensate collected in the inlet chamber for selectively connecting said pressure chamber with said inlet and outlet chambers whereby to control the operation of said valve.

3. A steam trap comprising an enclosed casing divided by a partition into an inlet and an outlet chamber in each of which there is provided an orifice for connecting the trap to a steam line, a discharge valve seated in a valve opening in said partition, a pressure responsive partition mounted in said casing and forming a pressure chamber with the top thereof, means connecting said latter partition to said discharge valve, a valve casing connected to said outlet chamber, said inlet chamber and said pressure chamber, a pilot valve disposed in said valve casing arranged to be operative in a manner to selectively connect said pressure chamber to either said inlet chamber or said outlet chamber for actuating said pressure responsive partition and thereby operate said discharge valve, and means for automatically operating said pilot valve in response to the amount of condensate collected in said inlet chamber.

4. A steam trap comprising an enclosed casing, a partition dividing said casing into an inlet chamber and an outlet chamber each of which have an orifice therein for connecting the trap to a steam line, a pressure responsive partition mounted in said inlet chamber and forming a pressure chamber in said casing, a discharge valve seated in a valve opening in said first-mentioned partition and connected to said last-mentioned partition for operation thereby, means for selectively connecting said pressure chamber to said inlet chamber or said outlet chamber, and a Venturi arrangement provided in said outlet chamber for producing a reduced pressure for communication to said pressure chamber when said discharge valve is opened and condensate is forced through said arrangement.

5. A steam trap comprising an enclosed casing having a partition therein dividing it into an inlet chamber and an outlet chamber each of which has an orifice therein for connecting the trap to a steam line, a valve seated in a valve opening in said partition to control the flow therefrom of the condensate collecting in the inlet chamber, a pressure responsive partition in said inlet chamber forming a pressure chamber with the top of the casing and connected to said discharge valve for controlling its operation, a valve casing in said inlet chamber connected to said outlet chamber, said inlet chamber and said pressure chamber, a pilot valve in said valve casing adapted to selectively connect said pressure chamber to either said inlet chamber or said outlet chamber for aiding said pressure responsive partition to actuate said discharge valve, and a float arranged in said inlet chamber and connected to said pilot valve to control the operation of the latter in accordance with the level of the condensate in the inlet chamber.

6. A steam trap comprising an open top casing having a partition therein dividing it into an inlet chamber and an outlet chamber each of which has an orifice in it for connecting the trap to a steam line, a valve seated in a valve opening in said partition, a cover for said casing, a flexible diaphragm mounted between said cover and casing and forming a pressure chamber with the former, a valve stem connected to said discharge valve for operating the latter in response to the movement of the flexible diaphragm, a valve casing connected to said first-mentioned partition and arranged to communicate with said inlet chamber, a pilot valve disposed in said valve casing for selectively connecting said pressure chamber to said inlet chamber or said outlet chamber, a float connected to said pilot valve and arranged to operate in accordance with the level of the condensate collected in said inlet chamber, and a Venturi partition in said outlet chamber adapted to produce a reduced pressure in said outlet chamber for communication to said pressure chamber when a flow is passed through it, all removable parts of the trap being removable from the top thereof.

7. A steam trap comprising a casing divided into an inlet chamber and an outlet chamber by a partition, each chamber having an orifice therein for connecting the trap in a steam line, a valve disposed in a valve opening in said partition for controlling the discharge of condensate from the inlet chamber, a pressure responsive element connected to said valve for operating the latter, means for supplying pressure to said element, a pilot valve mechanism including a pilot valve for controlling the pressure supplied to said pressure responsive element, a float for operating said pilot valve, and an over center device interposed between said float and pilot valve and adapted to positively operate said pilot valve in one direction when said float is at one elevation and in the other direction when it is at another elevation.

8. A steam trap comprising an enclosed casing having an inlet and an outlet orifice provided therein, a partition dividing said casing into an inlet chamber containing said inlet orifice and an outlet chamber containing said outlet orifice, a discharge valve seated in a valve opening in said partition, a flexible partition arranged in the upper portion of said inlet chamber and forming a pressure chamber with the top of said casing, means operably connecting said valve to said flexible partition, and means responsive to the level of condensate collected in the inlet chamber for selectively placing said pressure chamber in communication with the inlet chamber and the outlet chamber to control the opening and closing of said valve in response to the resultant movement of said flexible partition, said latter means consisting of a pilot valve mechanism, a float disposed in said inlet chamber and an over center device connected to be actuated by said float, said over center device being connected to actuate said valve when said float is supported at different elevations by the condensate in said inlet chamber.

9. A steam trap comprising an enclosed casing having an inlet and an outlet orifice provided therein, a partition dividing said casing into an inlet chamber containing said inlet orifice and an outlet chamber containing said outlet orifice, a discharge valve seated in a valve opening in said partition, a flexible partition arranged in the upper portion of said inlet chamber and forming a pressure chamber with the top of said casing, means operably connecting said valve to said flexible partition, and means responsive to the level of condensate collected in the inlet chamber for selectively placing said pressure chamber in communication with an auxiliary pressure when the condensate in the trap is at one level and the pressure chamber with a steam line to which the trap may be connected and the inlet chamber with said auxiliary pressure when the condensate is at a different level.

10. A steam trap for use in a vacuum system comprising a main casing, a partition dividing said casing into an inlet condensate collecting chamber and an outlet discharge chamber, each having an orifice therein for connecting the casing in a steam line, a discharge valve mounted in a valve opening in said partition, a flexible diaphragm mounted over the top of said casing and connected to said valve, a cover plate mounted over said diaphragm and forming a pressure chamber therewith, a check valve associated with said inlet chamber orifice, a pilot valve mechanism comprising means including a valve for selectively connecting said pressure chamber with an outside source of pressure and with the steam line with which the trap is used and the inlet chamber selectively with said steam line and with said outside source of pressure respectively, and means responsive to the level of the condensate in said inlet chamber arranged to operate said pilot valve mechanism.

11. A steam trap for use in a vacuum system comprising a main casing, a partition dividing said casing into an inlet condensate collecting chamber and an outlet discharge chamber, each having an orifice therein for connecting the casing in a steam line, a discharge valve mounted in a valve opening in said partition, a flexible diaphragm mounted over the top of said casing and connected to said valve, a cover plate mounted over said diaphragm and forming a pressure chamber therewith, a check valve associated with said inlet chamber orifice, a pilot valve mechanism comprising means including a valve for selectively connecting said pressure chamber with an outside source of pressure and with the steam line with which the trap is used and the inlet chamber selectively with said steam line and with said outside source of pressure respectively, a float arranged in said inlet chamber, an over center device arranged to be operated by said float, and means actuated by said over center device when said float is at predetermined levels for imparting a quick operating action to said pilot valve to thereby control the operation of said discharge valve.

12. A steam trap comprising an enclosed casing having an inlet and an outlet orifice provided therein, a partition dividing said casing into an inlet chamber containing said inlet orifice and an outlet chamber containing said outlet orifice, a discharge valve seated in a valve opening in said partition, a flexible partition arranged in the upper portion of said inlet chamber and forming a pressure chamber with the top of said casing, means operably connecting said valve to said flexible partition, means responsive to the level of condensate collected in the inlet chamber for selectively placing said pressure chamber in communication with the inlet chamber, and Venturi means for reducing the pressure in the outlet chamber when water is passed therethrough.

In testimony whereof, I sign my name.

JOHN M. MALONE.